J. Cochrane,
Lubricator.
Nº 14,010.　　　　Patented Jan. 1, 1856.
Fig. 1.　　　Fig. 2.　　　Fig. 3.
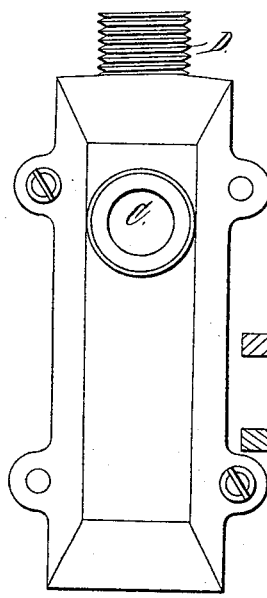
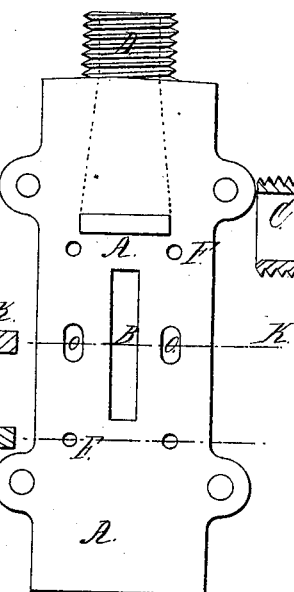
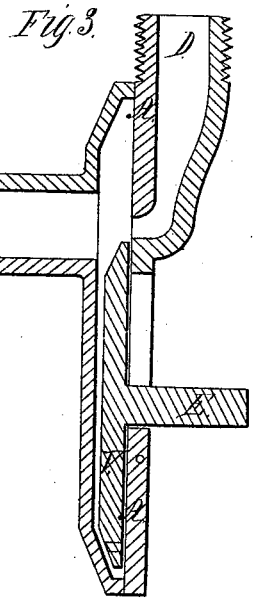
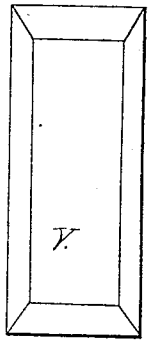
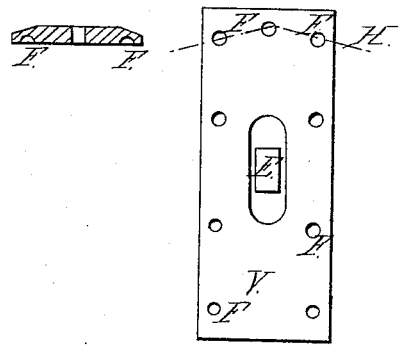
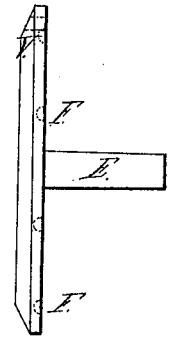
Witnesses:
John H. Summer
Peter E. DeMille.
Inventor:
James Cochrane.
AM. PHOTO-LITHO. CO. N.Y. (OSBORNE'S PROCESS)

UNITED STATES PATENT OFFICE.

JAMES COCHRANE, OF NEW YORK, N. Y.

METHOD OF OPERATING AND LUBRICATING SLIDE-VALVES.

Specification of Letters Patent No. 14,010, dated January 1, 1856.

*To all whom it may concern:*

Be it known that I, JAMES COCHRANE, of the city, county, and State of New York, have invented a new and useful Improvement in Moving and Lubricating Slide-Valves with Curved or Flat Surfaces, Under Pressure of Fluids, of which the following is a clear and exact description, reference being had to the accompanying drawing, making part of this specification, in which—

Figure 1 is a front elevation. Fig. 2 is a plan of valve face. Fig. 3 is a sectional elevation.

The same letters indicate like parts in all the figures.

To move the ordinary vibratory slide valves under pressure, the practice has been to attach the slide or valve to a rod that passed through a stuffing box. That is in all cases very objectionable from leakages and friction of rod passing through stuffing box. The lubrication has been effected by globe oil cups, &c., applying lubricating substances only to such parts of slide or face as happened to be presented, uncovered at the time of the entry of the substances into the steam or valve chest.

The object of my invention is to remedy these serious objections, and to reduce the friction, and to this end it consists in making an aperture or opening in the valve seat, for the purpose of introducing a pin or lever from or into the movable valve, which opening is surrounded with tight sliding surfaces and thus avoid the always troublesome stuffing box, and the leakage and friction attending it. To lubricate the valves or rubbing surfaces, I make another aperture that leads from any convenient part of slide seat to face of valve in such part as does not uncover by its motion, and also puncture the valve and seat in such parts as do not uncover by the valve motion with cavities to receive and retain the lubricating medium, and thus more effectually retain for its proper use the lubricating substance, and retain in easier order the very vital slide faces or rubbing surfaces.

In the accompanying drawing A represents the valve seat; B, the opening in the valve through which the lever is introduced or pin projected for uncovering or moving the valve V.

C is the inlet to the chest (intended for water in this case).

D is the outlet.

The power to open, or close the opening is exerted on the projecting pin E and in consequence of surrounding tight rubbing surfaces requires no stuffing box. The lubrication is effected by like or smaller apertures O O through the seat of valve, terminating in a tube or opening for injection, or to swab the lubricating substance, into this aperture O O, also with cavities F F passing and repassing each other by valve motion communicating with openings O O, through seat or not as required. In case of limited use the cavities F F alone would be sufficient depending upon the wear of the valve faces, for replenishing the supply of lubricating material, they being previously filled.

I have thus pointed out the nature of my invention, and the mode of application which I have tried with success, but I do not wish to be understood as limiting myself to this peculiar valve or its method for moving as to the cavities or openings for lubricating, for they may with similar advantage be applied to all sliding valves, cocks, &c.

What I claim and desire to secure by Letters Patent is—

1. Moving a vibratory flat or curved slide valve, within its chest, without the necessity of a stuffing box, by the means or similar ones to those described.

2. I claim substantially the method of lubricating slide valves as described; by and through an aperture of the valve or its seat.

JAMES COCHRANE.

Witnesses:
JOHN H. IMMEN, Jr.,
PETER E. DE MILLE,
JOHN T. HOFFMAN.